United States Patent
Wan

(10) Patent No.: US 11,838,377 B2
(45) Date of Patent: Dec. 5, 2023

(54) METHOD, APPARATUS, ELECTRONIC DEVICE AND STORAGE MEDIUM FOR TRAINING USER CLICK MODEL

(71) Applicant: BAIDU ONLINE NETWORK TECHNOLOGY (BEIJING) CO., LTD, Beijing (CN)

(72) Inventor: Li Wan, Beijing (CN)

(73) Assignees: Baidu Online Network Technology (Beijing) Co., Ltd., Beijing (CN); Shanghai Xiaodu Technology Co. Ltd., Shanghai (CN)

( * ) Notice: Subject to any disclaimer, the term of this patent is extended or adjusted under 35 U.S.C. 154(b) by 736 days.

(21) Appl. No.: 16/902,779

(22) Filed: Jun. 16, 2020

(65) Prior Publication Data

US 2021/0110303 A1    Apr. 15, 2021

(30) Foreign Application Priority Data

Oct. 10, 2019   (CN) .......................... 201910956994.7

(51) Int. Cl.
G06Q 30/00        (2023.01)
H04L 67/50        (2022.01)
G06F 16/9535      (2019.01)

(52) U.S. Cl.
CPC ........ *H04L 67/535* (2022.05); *G06F 16/9535* (2019.01)

(58) Field of Classification Search
None
See application file for complete search history.

(56) References Cited

U.S. PATENT DOCUMENTS 8,412,726 B2 *   4/2013  Yan ..................... G06F 16/9535
                                                   707/767
2008/0097822 A1 *  4/2008  Schigel ............... G06Q 10/063
                                                   709/224

(Continued)

FOREIGN PATENT DOCUMENTS

CN          104915388 A       9/2015
CN          108304441 A       7/2018
                   (Continued)

OTHER PUBLICATIONS

Teng; ClickBAIT-v2; NASA Ames Research; 8 pages; 2018.*
(Continued)

*Primary Examiner* — Radu Andrei
(74) *Attorney, Agent, or Firm* — Brooks Kushman P.C.

(57) ABSTRACT

A method, an apparatus, an electronic device and a storage medium for training a user click model, which relate to the artificial intelligence field, are disclosed. is the method may include: collecting a plurality of pieces of behavior data from a log database of users on a network, each piece of behavior data including a user's feedback information regarding resources in the network within a preset time period; generating a plurality of resource access features respectively corresponding to the plurality of pieces of behavior data, based on a pre-created header resource library and the plurality of pieces of behavior data; and training the user click model with the plurality of resource access features. The technical solution provides a lossless modeling manner which, compared to the existing modeling manners, may effectively optimize the precision and improve the accuracy of the user click model.

21 Claims, 3 Drawing Sheets

(56) References Cited

U.S. PATENT DOCUMENTS

| | | |
|---|---|---|
| 2015/0170049 A1 | 6/2015 | Mann et al. |
| 2019/0266206 A1 | 8/2019 | Zhong |
| 2023/0009814 A1* | 1/2023 | Hao .................. G06Q 30/0202 |

FOREIGN PATENT DOCUMENTS

| | | |
|---|---|---|
| JP | 2012118705 A | 6/2012 |
| JP | 2013033478 A | 2/2013 |
| JP | 2014203442 A | 10/2014 |
| JP | 2015088089 A | 5/2015 |
| WO | 2016107354 A1 | 7/2016 |

OTHER PUBLICATIONS

Zhang; Sequential Click Prediction; Microsoft; 7 pages; 2014.*
Wu, et al., Collaborative Denoising Auto-Encoders for Top-N Recommender Systems, WSDM'16, Proceedings of the Ninth ACM International Conference on Web Search and Data Mining, Feb. 22-25, 2016, p. 153-162.
Lin, et at., English Abstract of "Method Research for User Behavior Feedback Grid Resources Search", Acta Armamentarii, vol. 31, Issue 8, Aug. 15, 2010, 1 page.
Wu et al., "Collaborative Denoising Auto-Encoders for Top-N Recommender Systems", Proceedings of the Ninth ACM International Conference on Web Search and Data Mining (WSDM' 16), Feb. 8, 2016, pp. 153-162.
Deepak K. Agarwal, "Statistical Methods for Recommender System—Theory and Practice of Statistical Machine Learning", First Edition, Kyoritsu Shuppan, Col. Ltd., Apr. 25, 2018, pp. 3-12.
Search Report of Chinese patent application No. 2019109569947 dated Jan. 25, 2022, 2 pages.

* cited by examiner

METHOD, APPARATUS, ELECTRONIC DEVICE AND STORAGE MEDIUM FOR TRAINING USER CLICK MODEL

CROSS-REFERENCE TO RELATED APPLICATIONS

The present application claims the priority of Chinese Patent Application No. 2019109569947, filed on Oct. 10, 2019. The disclosure of the above application is incorporated herein by reference in its entirety.

TECHNICAL FIELD

The present disclosure relates to the technical field of computer applications, particularly to the technical field of artificial intelligence, and more particularly to a method, an apparatus, an electronic device and a storage medium for training a user click model.

BACKGROUND

As the Internet prevails, computers, mobile phones etc. are indispensable tools in life. Various content services are accessible by users via websites or applications (apps), and the user's feedback data to the cloud background by interacting with the websites or apps. The feedback data will be used by a cloud algorithm to create a user click model. As the data amount increases, the user model depicts the users deeper so that better recommended content may be derived according to the user click model, to thereby optimize the user experience.

Conventional modeling solutions of user click models include explicit tag modeling and implicit vector modeling. The problem with the explicit tag modeling lies in needing an extremely large bag of words to precisely depict the user's likes, for example, "military affairs", "animation", "Baidu company", etc. Each word in the bag of words needs to be accurately designed by the designer, and meanwhile, different words in the bag of words might be in a crossing relationship or dependency relationship. If the distribution of the designed bag of words is uneven or unreasonable, a final effect will be directly affected seriously. The implicit vector modeling mainly relates to using multi-dimensional vectors to represent features of users and resources simultaneously. A manner of simulating the user preferences by calculating vector similarity in the same feature space cannot effectively and directly represent the user's click model, and is only an agent mode.

Hence, in view of drawbacks in the prior art, it is desirable to provide an efficient user click model which is capable of accurately predicting the user's click information.

SUMMARY

Embodiments of the present disclosure are directed to a method, an apparatus, an electronic device and a storage medium for training a user click model, for remedying drawbacks in the prior art, providing an efficient and accurate user click model, and accurately predicting the user's click information.

According to an embodiment, a method for training a user click model is proposed, and the method includes: collecting a plurality of pieces of behavior data from a log database of users on a network, each piece of behavior data comprising a user's feedback information regarding resources in the network within a preset time period; generating a plurality of resource access features respectively corresponding to the plurality of pieces of behavior data, based on a pre-created header resource library and the plurality of pieces of behavior data; and training the user click model with the plurality of resource access features.

Optionally, in the above method, before the step of generating a plurality of resource access features respectively corresponding to the plurality of pieces of behavior data based on a pre-created header resource library and the plurality of pieces of behavior data, the method further includes: filtering a global resource library according to attribute information of resources in the global resource library to obtain IDs of a plurality of header resources; forming the header resource library with the IDs of the plurality of header resources.

Optionally, in the above method, the filtering a global resource library according to attribute information of resources in the global resource library to obtain IDs of a plurality of header resources includes at least one of: filtering the global resource library according to quality parameters of the resources in the global resource library to obtain IDs of a plurality of resources whose quality parameters are larger than a preset quality parameter threshold, as the IDs of the header resources; filtering the global resource library according to access popularity of the resources in the global resource library to obtain IDs of a plurality of resources whose access popularity is larger than a preset popularity threshold, as the IDs of the header resources; and filtering the global resource library according to discriminations of the resources in the global resource library to obtain IDs of a plurality of resources whose discriminations are larger than a preset discrimination threshold, as the IDs of the header resources, where the discriminations of the resources are equal to a variance of the number of user groups having different feedbacks corresponding to the resources; alternatively, the filtering a global resource library according to attribute information of resources in the global resource library to obtain IDs of a plurality of header resources includes at least one of: filtering the global resource library according to quality parameters of the resources in the global resource library to obtain IDs of Top N resources having the largest quality parameters, as the IDs of the header resources; filtering the global resource library according to access popularity of the resources in the global resource library to obtain IDs of Top M resources having the largest access popularity, as the IDs of the header resources; and filtering the global resource library according to discriminations of the resources in the global resource library to obtain IDs of Top W resources having the largest discriminations, as the IDs of the header resources; where N, M and W each is a positive integer.

Optionally, in the above method, the collecting a plurality of pieces of behavior data from a log database of users on a network includes: collecting the plurality of pieces of behavior data from the log database in a manner of at least one of: an explicit collection manner through preset event tracking, and an implicit collection manner by analyzing the user's feedback information regarding resources.

Optionally, in the above method, the step of, generating a plurality of resource access features respectively corresponding to the plurality of pieces of behavior data, based on a pre-created header resource library and the plurality of pieces of behavior data includes: obtaining the user's positive feedback information regarding resources in the header resource library in the behavior data; generating corresponding resource access features, based on the user's positive feedback information regarding resources in the header resource library in the behavior data, to obtain the plurality of resource access features.

Optionally, in the above method, the training the user click model with the plurality of resource access features includes: for each resource access feature in the plurality of resource access features, shielding partial valid data in the resource access features to obtain a resource access training feature; inputting the resource access training feature into the user click model to obtain resource access prediction feature output by the user click model; calculating a cross entropy function value based on the resource access feature and the resource access prediction feature; determining whether the cross entropy function value is equal to 0; if the value is not equal to 0, adjusting parameters of the user click model to make the cross entropy function value tend to 0; continuously training the user click model using the plurality of resource access features in the above manner, until the cross entropy function value is equal to 0 in training of preset continuous times, determining the parameters of the user click model, then determining the user click model.

An embodiment of the present disclosure further provides a method for resource recommendation, which includes: collecting real-time behavior data of a designated user within the most neighboring time period; obtaining real-time resource access features of the designated user according to the real-time behavior data and a pre-created header resource library; predicting k predicted resource IDs according to a pre-trained user click model, the real-time resource access features and the header resource library; and recommending resources to the designated user based on the k predicted resource IDs.

Optionally, in the above method, the predicting k predicted resource IDs according to a pre-trained user click model, the real-time resource access features and the header resource library includes: predicting predicted resource access features of the designated user according to the user click model and the real-time resource access features; obtaining the k predicted resource IDs based on the predicted resource access features, the real-time resource access features and the header resource library.

An embodiment of the present disclosure further provides an apparatus for training a user click model, which includes: a collecting module configured to collect a plurality of pieces of behavior data from a log database of users on a network, each piece of behavior data comprising a user's feedback information regarding resources in the network within a preset time period; a generating module configured to, generate a plurality of resource access features respectively corresponding to the plurality of pieces of behavior data, based on a pre-created header resource library and the plurality of pieces of behavior data; a training module configured to train the user click model with the plurality of resource access features.

An embodiment of the present disclosure further provides an apparatus for resource recommendation, which includes: a collecting module configured to collect real-time behavior data of a designated user within the most neighboring time period; an obtaining module configured to obtain real-time resource access features of the designated user according to the real-time behavior data and a pre-created header resource library; a predicting module configured to predict k predicted resource IDs according to a pre-trained user click model, the real-time resource access features and the header resource library; and a recommending module configured to recommend resources to the designated user based on the k predicted resource IDs.

An embodiment of the present disclosure further provides an electronic device, which include: at least one processor; and a memory communicatively connected with the at least one processor; wherein, the memory stores instructions executable by the at least one processor, and the instructions are executed by the at least one processor to enable the at least one processor to perform the above method for training the user click model, or perform the above method for resource recommendation.

An embodiment of the present disclosure provides a non-transitory computer-readable storage medium storing computer instructions therein, and the computer instructions are used to cause the computer to perform the above method for training the user click model, or perform the above method for resource recommendation.

An embodiment of the present disclosure has the following advantages or beneficial effects: the present disclosure may provide a lossless modeling manner by collecting the plurality of pieces of behavior data from the log database of users of the network, generating the plurality of resource access features respectively corresponding to the plurality of pieces of behavior data based on the pre-created header resource library and the plurality of pieces of behavior data, and by training the user click model with the plurality of resource access features. As compared with the existing modeling manner, the modeling manner according to an embodiment of the present disclosure may optimize effectively the precision of the user click model and may improve the accuracy of the user click model.

Furthermore, according to embodiments of the present disclosure, the global resource library may be filtered according to attribute information of resources in the global resource library such as the quality parameter, access popularity and/or discrimination to obtain the IDs of the plurality of header resources to create the header resource library, and IDs of some representative resources may be selected to constitute header resources, as center points of distribution calculation in the user click model, so that the model may be combined with the actual scenarios more accurately to use the behavior data of the actual scenarios to more accurately train the user click model. Therefore, the precision of the user click model may be improved, and the actual scenarios may be predicted more accurately.

Furthermore, according to embodiments of the present disclosure, the behavior data may be collected in two collection manners, namely, an explicit collection manner and an implicit connection manner, and thus the collection efficiency of the behavior data may be improved effectively, the collected content of the behavior data may be enriched, and the collection quality of the behavior data may be ensured.

Furthermore, according to embodiments of the present disclosure, the user's positive feedback information regarding the resources in the header resource library in the behavior data may be obtained; and corresponding resource access features may be generated based on the user's positive feedback information regarding the resources in the header resource library in the behavior data, so that the resource access features include only features corresponding to the positive feedback information without considering negative feedback and other things. Therefore, the concern type of the model may be simplified, and the accuracy of the trained model may be improved such that the trained user click model may predict more accurately the resources that a user interests in.

With the above technical solution of the method for resource recommendation, very accurate predicted resource IDs may be obtained, and resources may be recommend to the user more purposefully, and thus the recommending efficiency may be improved and the user's viscosity and use experience may be enhanced.

Other effects of embodiments of the present disclosure will be described hereunder in conjunction with specific embodiments.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications may be made to the embodiments described herein without departing from the scope and spirit of the application. Also, for the sake of clarity and conciseness, depictions of well-known functions and structures are omitted in the following description.

Figure 1:
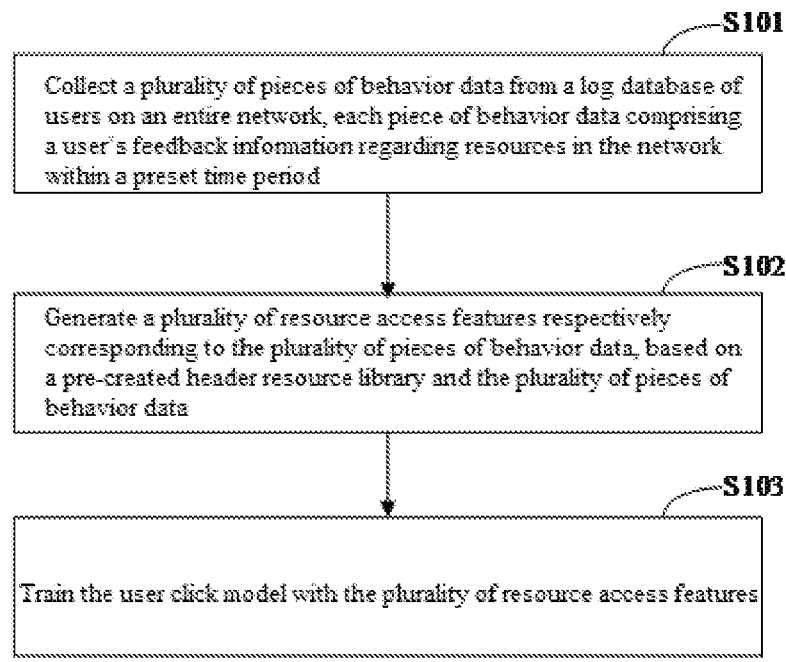
FIG. 1 is a flowchart of a method for training a user click model according to an embodiment of the present disclosure.

FIG. 1 is a flowchart of a method for training a user click model according to an embodiment of the present disclosure. As shown in FIG. 1, the method for training a user click model according to the embodiment may include the following steps:

S101: collecting a plurality of pieces of behavior data from a log database of users on a network such as entire network, each piece of behavior data including a user's feedback information regarding resources in the network within a preset time period;

The method for training the user click model according to the embodiment may be performed by an apparatus for training the user click model. The apparatus for training the user click model may include an electronic entity such as a large-size computer device, or may employ software-integrated application system, to implement the training of the user click model.

In the embodiment, a plurality of pieces of behavior data may be collected from a log database of users on the network, such as on the entire/whole network, to construct training data for training the user click model. Each piece of behavior data includes a user's feedback information regarding resources in the network within a preset time period; the preset time period may be taken as desired, e.g., several minutes, several hours or several days etc., and will not be limited herein. In addition, a format of the behavior data in the embodiment may be represented as: a user ID, a resource ID and the user's feedback information regarding the resource corresponding to the resource ID, and may include a like feedback manner and a dislike feedback manner. In an embodiment, the feedback information is classified merely into two types: like and dislike, and the like feedback may be a strong feedback, and the dislike feedback may include the user's disregard and the user's direct expression of dislike. Since a piece of behavior data includes the behavior data regarding access to resources with the preset time period, the resource information included in each piece of behavior data may include information of a plurality of resources, and the user's feedback information regarding each resource in the behavior data is specifically recorded.

The collecting a plurality of pieces of behavior data from a log database of users on a network, such as entire network, in the embodiment may include at least one of the following manners: an explicit collection manner through preset event tracking, and an implicit collection manner by analyzing the user's feedback information regarding all resources.

When the behavior data are collected by reasonably design the event tracking, the data may include the user's explicit feedback information regarding displayed resources. At this time, the user ID, resource ID and the displayed feedback information may be collected directly to together identify the user's one piece of behavior data. The explicit feedback information is that user feedback likes or dislikes the resource.

The feedback information in the implicit collection manner is obtained through certain inference. For example, the feedback information may be represented by analyzing at least one of the following types according to the collected behavior data: whether the user finished the browsing of a certain resource, whether the user quickly switches after the resource is recommended, and whether the user's browsing duration on a webpage of a certain resource exceeds a preset duration threshold. For example, if the user finished the browsing of a certain resource, it may be determined that the user likes the resource; if the user switches without finishing browsing the resource, it may be determined that the user dislikes the resource. For another example, if the user directly switches without clicking the resource recommended to the user, it may be determined that the user dislikes the resource; and if, after the resource is recommended to the user, the user does not switch directly but browses the resource for a period of time, it may be determined that the user likes the resource. For another example, the user's stay duration on a webpage of each resource may be detected. If the duration exceeds a preset duration threshold, it may be determined that the user likes the resource, otherwise it may be determined that the user dislikes the resource.

The plurality of pieces of behavior data may be collected in either of the collection manners. Each piece of behavior data may include the user's ID, IDs of a plurality of resources accessed by the user within the preset time period, and the user's feedback information regarding each resource.

S102: generating a plurality of resource access features respectively corresponding to the plurality of pieces of behavior data, based on a pre-created header resource library and the plurality of pieces of behavior data;

In the pre-created header resource library in the embodiment, by using resource-granularity global statistic and filtering, IDs of a plurality of representative header resources are obtained by making statistic to and filtering a global resource library. For example, the IDs of the plurality of representative header resources may be obtained by filtering the global resource library based on attribute information of the resources, where the attribute information of the resources may include quality parameters, access popularity and/or discrimination of resources. For example, before step S102, the method may further include: filtering the global resource library according to the attribute information of resources in the global resource library to obtain the IDs of the plurality of header resources; then forming the header resource library of the IDs with the plurality of header resources.

Optionally, filtering the global resource library according to the attribute information of resources in the global resource library to obtain the IDs of the plurality of header resources includes at least one of the following manners:

(A) filtering the global resource library according to quality parameters of the resources in the global resource library to obtain IDs of a plurality of resources whose quality parameters are larger than a preset quality parameter threshold, as the IDs of the header resources;

(B) filtering the global resource library according to access popularity of the resources in the global resource library to obtain IDs of a plurality of resources whose access popularity is larger than a preset popularity threshold, as the IDs of the header resources; and (C) filtering the global resource library according to discriminations of the resources in the global resource library to obtain IDs of a plurality of resources whose discriminations are larger than a preset discrimination threshold, as the IDs of the header resources; where the discriminations of the resources are equal to a variance of the number of user groups having different feedbacks corresponding to the resources.

The global resource library according to an embodiment records IDs of respective resources as well as respective attribute information of each resource, such as quality parameter, access popularity and discrimination, where the discrimination of each resource is equal to a variance of the number of user groups having different feedbacks corresponding to the resources. For example, it is possible to make statistics to like feedbacks and dislike feedbacks of a certain group of users regarding respective resources, and take a variance based on the number of users liking each resource and number of users disliking the resource, as the discrimination of the resource. The quality parameter of each resource is parameter value comprehensively set for the resource by referring to information such as resource providers, resource integrity, scores and recommendation indexes. For example, regarding the resources with better faith, the scores of the quality parameters of the provided resources may be higher; the scores of the quality parameters of the resources with better integrity may also be higher; the higher the score of the resource, the higher recognition degree the user has for the resource, and the better quality the resource has, whereupon the score of the quality parameter of the resource may also be higher; likewise, the quality parameter of the resource having a higher recommendation index may also have a higher score. For example, weighted summation may be performed by referring to parameters affecting the quality parameters of the resources, and then averaged as the quality parameter of the resource obtained after comprehensive analysis. Certainly, in practical application, a value of a certain parameter may be used as the quality parameter, or the quality parameter of the resource may be obtained in other manners, which will not be detailed one by one. In addition, times of access to the resources within the most neighboring time period may be taken as the access popularity of the resources.

Alternatively, in an embodiment, filtering the global resource library to obtain the IDs of the plurality of header resources may include at least one of the following manners:

(A') filtering the global resource library according to quality parameters of the resources in the global resource library to obtain IDs of Top N resources having the largest quality parameters, as the IDs of the header resources;

(B') filtering the global resource library according to access popularity of the resources in the global resource library to obtain IDs of Top M resources having the largest access popularity, as the IDs of the header resources; and (C') filtering the global resource library according to discriminations of the resources in the global resource library to obtain IDs of Top W resources having the largest discrimination, as the IDs of the header resources.

N, M and W in the embodiment each is a positive integer and the specific values of all three or arbitrary two of N, M and W may be equal, or the specific values of N, M and W are different from each other, which is not limited herein.

In the embodiment, the plurality of resource access features respectively corresponding to the plurality of pieces of behavior data may be specifically generated for example in the following manner based on the above created header resource library and the obtained plurality of pieces of behavior data: obtaining the user's positive feedback information regarding resources in the header resource library in the behavior data; generating corresponding resource access features, based on the user's positive feedback information regarding resources in the header resource library in the behavior data, to obtain the plurality of resource access features.

For example, the positive feedback information in the embodiment represents that the user likes the resource, and the user's dislike of the resource or disregard of the resource will not be taken into account in the embodiment. For example, if the header resource library includes 500 header resource IDs, it is possible to analyze whether the feedback information regarding resources corresponding to the accessed resource IDs in the 500 header resource IDs in the behavior data is the positive feedback, and retain the corresponding positive feedback information and corresponding header resource IDs. Then, 1*500 vectors may be generated, each column corresponds to a header resource ID, valid data, such as 1, is filled only at a position corresponding to the header resource ID having the positive feedback, whereas 0 is filled at other positions corresponding to header resource IDs not accessed by the user and header resource IDs corresponding to the negative feedback. As such, the 1*500 vectors may be used to identify the resource access features that the user accesses the header resource library. The valid data in the embodiment represents the data filled at the position corresponding to the header resource ID corresponding to the positive feedback information, whereas data at other positions are marked as 0, which is invalid data.

If in a piece of behavior data the corresponding user has only accessed resources corresponding to 20 header resource IDs in 500 header resources IDs, and feedback information regarding the resources corresponding to the accessed 15 header resource IDs is positive feedback, i.e., the user likes the resource. At this time, 1 is filled at the positions corresponding to the header resource IDs corresponding to only 15 in the 1*500 vectors generated accordingly, and 0 is filled at other positions. In practical application, other numbers may be used in place of 1, and will not be limited herein. In addition, in practical application, the corresponding resource access features may also be generated in other manners based on the user's positive feedback information regarding the resources in the header resource library in respective behavior data, which will not be detailed here.

In the embodiment, the IDs of some representative resources may be selected to constitute the header resources, and may serve as center points of distribution calculation in the user click model. Different from ordinary clustering, these center points are not clustering centers, but anchor points of a Gaussian distribution. These anchor points per se have learnable scores. Even if initial anchor points are not selected good enough, the algorithm automatically optimizes, by back propagation, the distribution and maximum value of these anchor points in a high-latitude space. In an embodiment, most representative anchor points may be selected to combine the model and actual scenarios more accurately.

S103: training the user click model with the plurality of resource access features.

In this step, the user click model is trained with the plurality of resource access features. Upon training, the greater the number of the resource access features is, the more accurate the trained user click model is. For example, the number of the collected resource access features in an embodiment may reach more than one million levels to improve the accuracy of the user click model.

For example, the step relates to training the user click model with the plurality of resource access features, and may specifically include the following steps to train the user click model:

(a) for each resource access feature in the plurality of resource access features, shielding (or blocking or covering or concealing) partial valid data in the resource access feature to obtain a resource access training feature;

For example, when there are 500 header resource IDs in the header resource library, the corresponding resource access feature is a 1*500 vector, and valid data such as 1 is filled at positions corresponding to header resource IDs having positive feedback information in the corresponding behavior data. To facilitate subsequent training, partial valid data in the resource access feature may be shielded in this step. By shielding, the data corresponding to the position of the header resource becomes 0, i.e., it is determined that the user did not access the resource corresponding to the header resource ID. In an embodiment, the valid data of a certain proportion of the total amount of valid data included in the resource access features may be shielded, e.g., 10%, 20% or other proportions of the valid data may be shielded. The corresponding resource access training features may be obtained by processing each resource access feature according to this step. Alternatively, if the training data is not enough, different proportions of the plurality of resource access features may be shielded to generate respectively a plurality of resource access training features, so as to enrich the training data.

(b) inputting the resource access training feature into the user click model to obtain a resource access prediction feature output by the user click model;

(c) calculating a cross entropy function value based on the resource access feature and the resource access prediction feature;

(d) determining whether the cross entropy function value is equal to 0; performing step (e) if the value is not equal to 0; or performing step (f) if the value is equal to 0;

(e) adjusting parameters of the user click model to make the cross entropy function value tend to 0;

(f) determining whether the cross entropy function value is equal to 0 in training at each time of preset continuous times; returning to step (a) if NO, and continuing to train the user click model constantly in the above manner using the plurality of resource access features; if YES, determining (or ascertaining) the parameters of the user click model, then determining (or ascertaining) the user click model and ending the training.

Before training, an initial value may be randomly assigned to each parameter of the user click model. Upon training, a resource access training feature is input to the user click model, whereupon the user click model may predict and output a resource access prediction feature based on the resource access training feature. Since each resource access training feature is obtained based on the resource access feature, theoretically if the user click model predicts accurately, the resource access prediction feature should be equal to the resource access feature. Hence, the cross entropy function value may be calculated based on the resource access feature and the corresponding resource access prediction feature; whether the cross entropy function value is equal to 0 may be determined; if the value is not equal to 0, which indicates that user click model predicts inaccurately, the parameters of the user click model may be adjusted so that the cross entropy function value tend to 0. Then, the user click model is continuously trained in the above manner, and the parameters of the user click model are continuously adjusted. To avoid the situation in which the cross entropy function value in one training is equal to 0 merely by accident but the user click model is not yet duly trained, in an embodiment, the user click model is considered as being duly trained only if the cross entropy function value is equal to 0 in preset continuous times of training. After the user click model is duly trained, the parameters of the user click model are determined (or ascertained), and the user click model is determined (or ascertained). The preset continuous times in an embodiment may be determined according to actual experience to be 50, 100 or other values.

In addition, training as per one piece of data might cause consumption of longer period of time, and the training efficiency is not high. In practical application, the user click model may be trained as per a set of data on the same training principle, which will not be detailed here.

For the user click model according to an embodiment of the present disclosure, the user's points of interest are implicitly modeled as a distribution on a multi-dimensional space, the user click model employs an improved autoencoder model which uses Gaussian smoothing to superimpose and cross the user's points of interest, and neural network model is used to model these points of interest and the distribution thereof.

A prototype of the user click model according to an embodiment of the present disclosure employs the autoencoder model, with a perception layer being added between a compression layer and decomposition layer of the autoencoder. Specifically, the user click model refers to a mean field theory to fit the distribution of resource clicks, and theoretically achieves lossless simulation of any distribution. The training of the model is completed by continuously inputting data and using a gradient descent neural network optimization algorithm.

Unlike the conventional tag modeling, the user click model according to an embodiment of the present disclosure does not use signals of the explicit bag of words with subjective consciousness, and avoids the bias of the user click model. Unlike the conventional implicit vector modeling, in an embodiment of the present disclosure the user is not coded as a vector used directly for calculation, since, as a displayed character representation, it has a pressure loss and loss of information. According to information theories, the information amount of a one-dimensional vector may be related to the number of bits of the vector, and the space and representation capability are both limited. Therefore, the technologies of an embodiment of the present disclosure may optimize the modeling precision of the user click model, and meanwhile reduce the data amount needed to obtain the precision, and reduce the costs needed to obtain the enhancement of the click rate while greatly improving the click rate.

For example, such a lossless modeling mode of the embodiments of the present disclosure may be used in the universal recommendation system of the content service providers to capture effectively the user's behaviors such as click, adoption and rejection on the resources, and record them efficiently in the user click model, which may substantially improve the adaption rate of the recommended products and bring about the growth of use duration and use activity.

In addition, in an embodiment of the present disclosure, stream-type behavior data may be collected to create a training closed ring based on the user's stream-type log, to improve the training efficiency. For example, each user's log data may be arranged in a stream manner in sequential time order from a log database of users on the network, and when the behavior data are collected, the data are collected for the same user in a stream manner in sequential time order. Correspondingly, upon training according to step 103, training is also respectively performed sequentially in the sequential time order of the resource access features corresponding to the respective behavior data. As such, the user's new interaction behavior data may be enabled to continuously update the user click model as the feedback loop triggers the training, to form the closed loop training, which may theoretically shorten the training time and effectively improve the training effect of the user click model.

The method of training the user click model of the embodiment may provide a lossless modeling manner by collecting the plurality of pieces of behavior data from the log database of users of the network, generating the plurality of resource access features respectively corresponding to the plurality of pieces of behavior data based on the pre-created header resource library and the plurality of pieces of behavior data, and by training the user click model with the plurality of resource access features. As compared with the existing modeling manner, the modeling manner according to an embodiment of the present disclosure may optimize effectively the precision of the user click model and improve the accuracy of the user click model.

Furthermore, according to an embodiment of the present disclosure, the global resource library may be filtered according to attribute information of the resources in the global resource library such as the quality parameter, access popularity and/or discrimination to obtain the IDs of the plurality of header resources to create the header resource library, IDs of some representative resources may be selected to constitute header resources, as center points of distribution calculation in the user click model, and the model may be combined with the actual scenarios more accurately to use the behavior data of the actual scenarios to more accurately train the user click model, and thus the precision of the user click model may be improved and the actual scenarios may be predicted more accurately.

Furthermore, according to an embodiment of the present disclosure, the behavior data may be collected in two collection manners, including, an explicit collection manner and an implicit connection manner, the collection efficiency of the behavior data may be improved effectively, the collected content of the behavior data may be enriched, and the collection quality of the behavior data may be ensured.

Furthermore, according to an embodiment of the present disclosure, the user's positive feedback information regarding the resources in the header resource library in the behavior data may be obtained; and corresponding resource access features may be generated based on the user's positive feedback information regarding the resources in the header resource library in the behavior data, so that the resource access features include only features corresponding to the positive feedback information without considering negative feedback and other things, to simplify the concern type of the model, and provide the accuracy of the trained model such that the trained user click model may more accurately predict the interesting resources for users.

Figure 2:
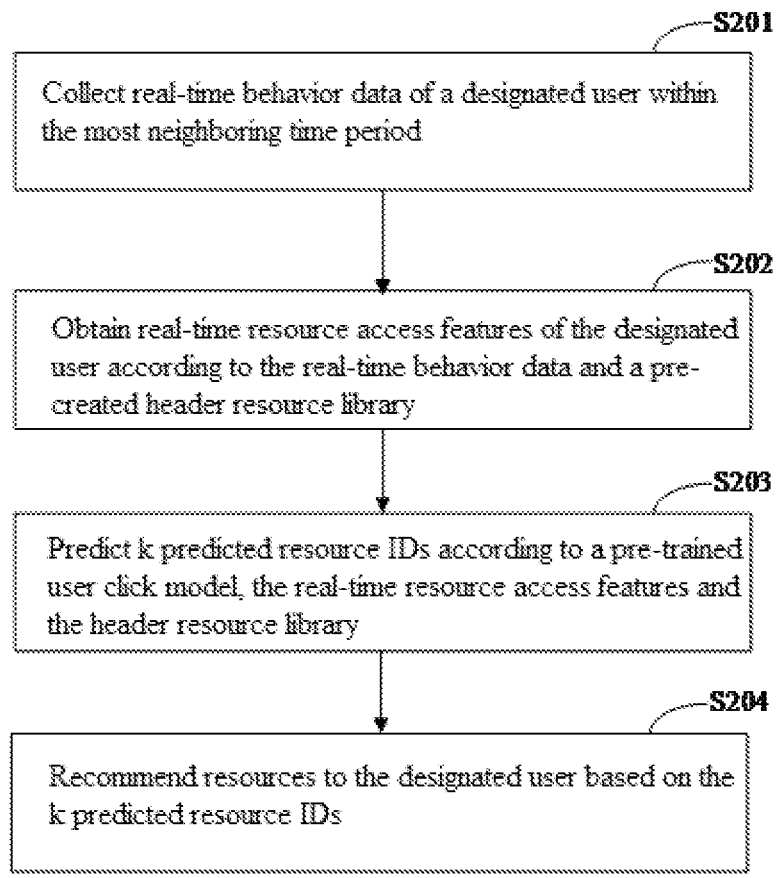
FIG. 2 is a flowchart of a method for resource recommendation according to an embodiment of the present disclosure.

FIG. 2 is a flowchart of a method for resource recommendation according to an embodiment of the present disclosure. As shown in FIG. 2, the method for resource recommendation according to the embodiment may specifically include the following steps:

S201: collecting real-time behavior data of a designated user within the most neighboring time period;

The method for resource recommendation according to the embodiment is an application of the trained user click model as stated in the embodiment with reference to FIG. 1. In practical application, the trained user click model may also be applied to other scenarios such as resource analysis, resource statistics and so on, which will not be listed one by one.

The subject performing the method for resource recommendation of the embodiment may be an apparatus for resource recommendation. Likewise, the apparatus for resource recommendation may be an independent electronic entity or a software-integrated application system.

In practical application, the apparatus for resource recommendation may be independent from or integral with the apparatus for training the user click model of the embodiment referring to FIG. 1, which will not be limited herein.

In the embodiment, it is possible to implement prediction of resources that might be accessed by the user in the future, based on the user's current real-time behavior data, to recommend resources in a targeted and purposeful manner.

Firstly, in an embodiment, the real-time behavior data of the designated user within the most neighboring time period may be employed, and the most neighboring time period may be a period of the latest one minute, three minutes or longer time period before the current time, and may be specifically set according to actual requirement so long as it meets the real-time requirement of specific scenarios. Likewise, the information included by the real-time behavior data of the embodiment is similar to the behavior data included in the embodiment referring to FIG. 1. Detailed reference may be made to the behavior data of the embodiment referring to FIG. 1, which will not be detailed here.

S202: obtaining real-time resource access features of the designated user according to the real-time behavior data and a pre-created header resource library;

The pre-created header resource library used in this embodiment is the same as the above embodiment referring to FIG. 1, and the real-time resource access features of this embodiment is obtained referring to the method for obtaining the resource access features in the above embodiment referring to FIG. 1. For particulars, reference may be made to the depictions of the above embodiment referring to FIG. 1, which will not be detailed herein.

S203: predicting k predicted resource IDs according to a pre-trained user click model, the real-time resource access features and the header resource library;

The k in the embodiment may be any positive integer.

For example, the step S203, namely, the predicting k predicted resource IDs according to the user click model, the real-time resource access features and the header resource library may specifically include the following steps:

(1) predicting predicted resource access features of the designated user according to the user click model and the real-time resource access features;
(2) obtaining the k predicted resource IDs based on the predicted resource access features, the real-time resource access features and the header resource library.

Specifically, since the real-time resource access features are obtained on a shorter time period, the content is not rich enough. In this embodiment, features of all resources that might be accessed by the user are predicted using the user click model based on the real-time resource access features, i.e., the predicted resource access features may be obtained. For example, an example is taken in which the header resource library includes 500 header resource IDs. The real-time resource access features might include only 20 valid data, which indicates that the user's feedback information regarding 20 header resources accessed within the most neighboring time period is like, whereupon the user click model is used to predict the header resources that might be clicked by the user in the future. However, the user click model cannot predict directly the IDs of header resources that might be clicked in the future, but conceals information of these header resources in the predicted resources access features, e.g., at this time, the predicted resource access features might include 100 valid data, namely, non-zero data.

Specifically, when the k predicted resource IDs are obtained based on the predicted resource access features, the real-time resource access features and the header resource library, it is possible to compare the predicted resource access features with the real-time resource access features, obtain newly-increased valid data in the predicted resource access features relative to the real-time resource access features, then arrange all the newly-increased valid data in the predicted resource access features in a descending order to obtain top k valid data; and obtain resource IDs in the header resource library respectively corresponding to the top k valid data in the predicted resource access features, to obtain k predicted resource IDs. As in the above example, if the predicted resource access features include 100 valid data, there are 80 newly-increased valid data in addition to valid data at positions corresponding to 20 valid data of the real-time resource access features. The 80 valid data are arranged in a descending order to obtain top k valid data, where k may take any positive integer according to needs, e.g., 10, 8 or any other values. Then, the IDs of the header resources corresponding to k valid data in the predicted resource access features are obtained in conjunction with the header resource library.

S204: recommending resources to the designated user based on the k predicted resource IDs.

With the above technical solution of the method for resource recommendation of this embodiment, more accurate predicted resource IDs may be obtained, and thus resources may be recommended to the user more purposefully. Therefore, the recommending efficiency may be improved, the user's viscosity may be enhanced, and use experience may be enriched.

Figure 3:
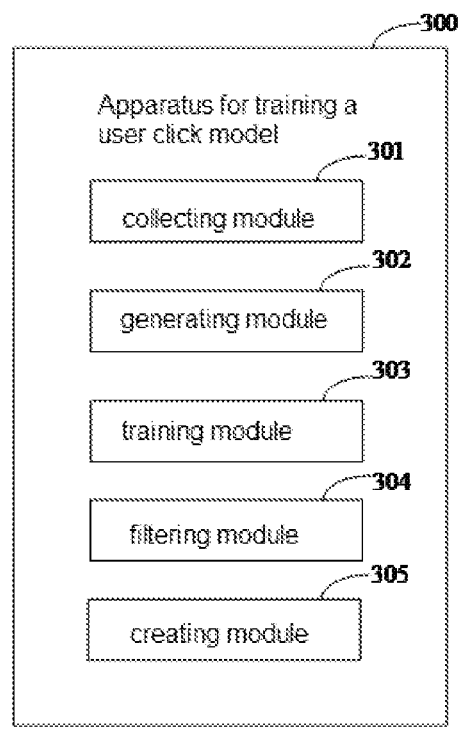
FIG. 3 is a structural diagram of an apparatus for training the user click model according to an embodiment of the present disclosure.

FIG. 3 is a structural diagram of an apparatus for training the user click model according to an embodiment of the present disclosure. As shown in FIG. 3, the apparatus 300 for training the user click model according to this embodiment may specifically include: a collecting module 301 configured to collect a plurality of pieces of behavior data from a log database of users on a network, each piece of behavior data comprising a user's feedback information regarding resources in the network within a preset time period; a generating module 302 configured to, generate a plurality of resource access features respectively corresponding to the plurality of pieces of behavior data, based on a pre-created header resource library and the plurality of pieces of behavior data; a training module 303 configured to train the user click model with the plurality of resource access features.

Optionally, the apparatus 300 for training the user click model according to an embodiment may further include: a filtering module 304 configured to filter a global resource library according to attribute information of the resources in the global resource library to obtain IDs of a plurality of header resources; a creating module 305 configured to form the header resource library with the IDs of the plurality of header resources.

Optionally, the filtering module 304 may be configured to perform at least one of: filtering the global resource library according to quality parameters of the resources in the global resource library to obtain IDs of a plurality of resources whose quality parameters are larger than a preset quality parameter threshold, as the IDs of the header resources; filtering the global resource library according to access popularity of the resources in the global resource library to obtain IDs of a plurality of resources whose access popularity is larger than a preset popularity threshold, as the IDs of the header resources; and filtering the global resource library according to discriminations of the resources in the global resource library to obtain IDs of a plurality of resources whose discriminations are larger than a preset discrimination threshold, as the IDs of the header resources; wherein the discriminations of the resources are equal to a variance of the number of user groups having different feedbacks corresponding to the resources.

Alternatively, the filtering module 304 may be configured to perform at least one of: filtering the global resource library according to quality parameters of the resources in the global resource library to obtain IDs of Top N resources having the largest quality parameters, as the IDs of the header resources; filtering the global resource library according to access popularity of the resources in the global resource library to obtain IDs of Top M resources having the largest access popularity, as the IDs of the header resources; and filtering the global resource library according to discriminations of the resources in the global resource library to obtain IDs of Top W resources having the largest discriminations, as the IDs of the header resources; where N, M and W each is a positive integer.

Optionally, in the apparatus 300 for training the user click model according to an embodiment, the collecting module 301 is specifically configured to: collect the plurality of pieces of behavior data from the log database in a manner of at least one of: an explicit collection manner through preset event tracking, and an implicit collection manner by analyzing the user's feedback information regarding all resources.

Optionally, in the apparatus 300 for training the user click model according to an embodiment, the generating module 302 is specifically configured to: obtain the user's positive feedback information regarding resources in the header resource library in the behavior data; generate corresponding resource access features, based on the user's positive feedback information regarding resources in the header resource library in the behavior data, to obtain a plurality of resource access features.

Optionally, in the apparatus 300 for training the user click model according to an embodiment, the training module 303 is specifically configured to: for each resource access feature in the plurality of resource access features, shield partial valid data in the resource access features to obtain a resource access training feature; input the resource access training feature into the user click model to obtain a resource access prediction feature output by the user click model; calculate a cross entropy function value based on the resource access feature and the resource access prediction feature; determine whether the cross entropy function value is equal to 0; if the value is not equal to 0, adjust parameters of the user click model to make the cross entropy function value tend to 0; continuously train the user click model using the plurality of resource access features in the above manner, until the cross entropy function value is equal to 0 in training of preset continuous times, determine the parameters of the user click model, then determine the user click model.

The principles and technical effect of the apparatus 300 for training the user click model according to these embodiments in implementing the training of the user click model are the same as those of the above relevant method embodiments. For particulars, please refer to the disclosure of the above relevant method embodiments, which will not be detailed herein.

Figure 4:
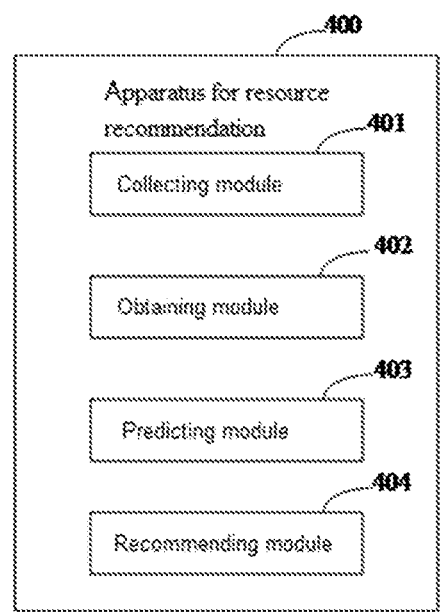
FIG. 4 is a structural diagram of an apparatus for resource recommendation according to an embodiment of the present disclosure.

FIG. 4 is a structural diagram of an apparatus for resource recommendation according to an embodiment of the present disclosure. As shown in FIG. 4, the apparatus for resource recommendation 400 in this embodiment may specifically include: a collecting module 401 configured to collect real-time behavior data of a designated user within the most neighboring time period; an obtaining module 402 configured to obtain real-time resource access features of the designated user according to the real-time behavior data and a pre-created header resource library; a predicting module 403 configured to predict k predicted resource IDs according to a pre-trained user click model, the real-time resource access features and the header resource library; and a recommending module 404 configured to recommend resources to the designated user based on the k predicted resource IDs.

Optionally, in the apparatus for resource recommendation 400 of this embodiment, the predicting module 403 is specifically configured to: predict predicted resource access features of the designated user according to the user click model and the real-time resource access features; obtain the k predicted resource IDs based on the predicted resource access features, the real-time resource access features and the header resource library.

The principles and technical effect of the apparatus for resource recommendation 400 in these embodiments in implementing resource recommendation are the same as those of the above relevant method embodiment. For particulars, please refer to the disclosure of the above relevant method embodiments, which will not be detailed herein.

According to some embodiments of the present disclosure, the present disclosure further provides an electronic device and a readable storage medium.

Figure 5:
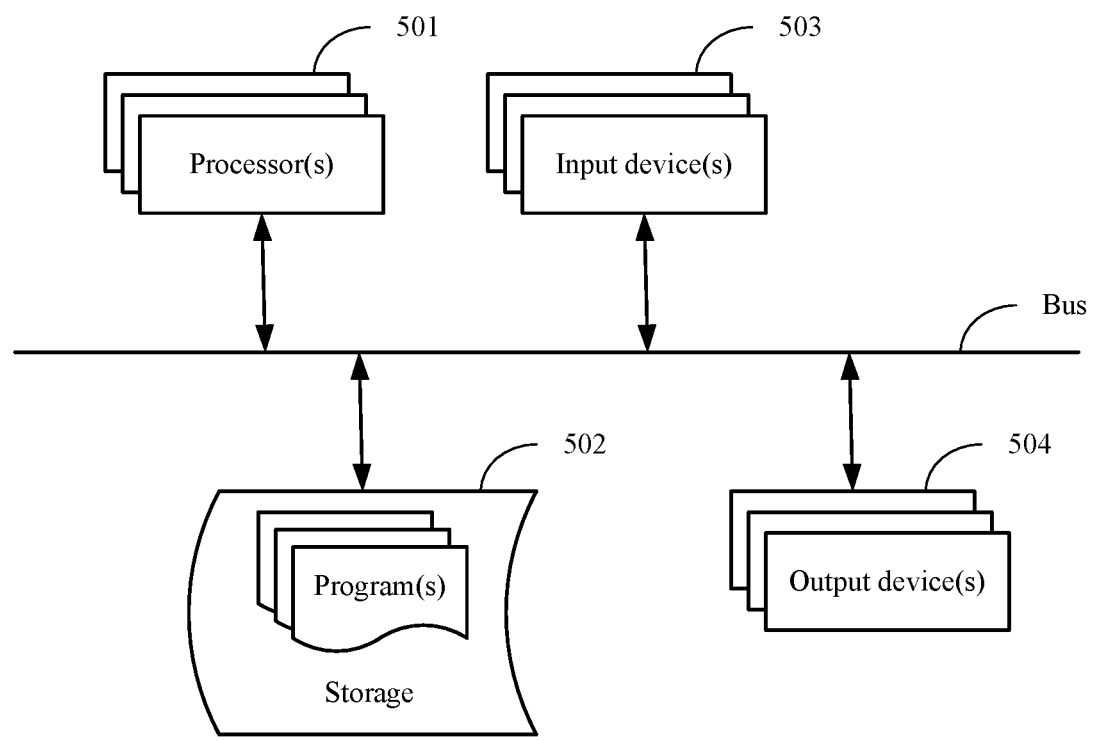
FIG. 5 is a block diagram of an electronic device for implementing a method of training a user click model or resources recommendation according to embodiments of the present disclosure.

FIG. 5 shows a block diagram of an electronic device for implementing the training of the user click model or resource recommendation according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 5, the electronic device includes: one or more processors 501, a storage 502, and interfaces connected to components and including a high-speed interface and a low speed interface. Each of the components are interconnected using various busses, and may be mounted on a common motherboard or in other manners as appropriate. The processor may process instructions for execution within the electronic device, including instructions stored in the memory or on the storage device to display graphical information for a GUI on an external input/output device, such as display coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). Processor 501 is taken as an example in FIG. 5.

The storage 502 is a non-transitory computer-readable storage medium provided by an embodiment of the present disclosure. Where, the storage stores instructions executable by at least one processor, so that the at least one processor executes the method for training the user click model or method for resource recommendation according to an embodiment of the present disclosure. The non-transitory computer-readable storage medium of the present disclosure stores computer instructions, which are used to cause a computer to execute the method for training the user click model or the method for resource recommendation provided by the present disclosure.

The storage 502 is a non-transitory computer-readable storage medium and may be used to store non-transitory software programs, non-transitory computer executable programs and modules, such as program instructions/modules corresponding to the method for training the user click model or method for resource recommendation in the embodiments of the present disclosure (e.g., modules shown in FIG. 3 or modules shown in FIG. 4). The processor 501 executes various functional applications and data processing of the server, i.e., implements the method for training the user click model or the method for resource recommendation in the above method embodiments, by running the non-transitory software programs, instructions and modules stored in the storage 502.

The storage 502 may include a storage program region and a storage data region, wherein the storage program region may store an operating system and an application program needed by at least one function; the storage data region may store data created according to the use of the electronic device for implementing the method for training the user click model or the method for resource recommendation according to the embodiments of the present disclosure. In addition, the storage 502 may include a high-speed random access memory, and may also include a non-transitory memory, such as at least one magnetic disk storage device, a flash memory device, or other non-transitory solid-state storage device. In some embodiments, the storage 502 may optionally include a memory remotely arranged relative to the processor 501, and these remote memories may be connected to the electronic device for implementing method for training the user click model or resource recommendation method according to embodiments of the present disclosure through a network. Examples of the above network include, but are not limited to, the Internet, an intranet, a local area network, a mobile communication network, and combinations thereof.

The electronic device for implementing the method for training the user click model or resource recommendation method may further include an input device 503 and an output device 504. The processor 501, the storage 502, the input device 503 and the output device 504 may be connected through a bus or in other manners. In FIG. 5, the connection through the bus is taken as an example.

The input device 503 may receive inputted numeric or character information and generate key signal inputs related to user settings and function control of the electronic device for implementing the method for training the user click model or method for resource recommendation, and may be an input device such as a touch screen, keypad, mouse, trackpad, touchpad, pointing stick, one or more mouse buttons, trackball and joystick. The output device 504 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The technical solutions of these embodiment may provide a lossless modeling manner by collecting the plurality of pieces of behavior data from the log database of users of the network, generating the plurality of resource access features respectively corresponding to the plurality of pieces of behavior data based on the pre-created header resource library and the plurality of pieces of behavior data, and by training the user click model with the plurality of resource access features. As compared with the existing modeling manner, the modeling manner according to an embodiment of the present disclosure may optimize effectively the precision of the user click model and may improve the accuracy of the user click model.

Furthermore, according to embodiments of the present disclosure, the global resource library may be filtered, according to attribute information of resources in the global resource library such as the quality parameter, access popularity and/or discrimination, to obtain the IDs of the plurality of header resources to create the header resource library, and IDs of some representative resources may be selected to constitute header resources, as center points of distribution calculation in the user click model, so that the model may be combined with the actual scenarios more accurately to use the behavior data of the actual scenarios to more accurately train the user click model. Therefore, the precision of the user click model may be improved and the actual scenarios may be predicted more accurately.

Furthermore, according to embodiments of the present disclosure, the behavior data may be collected in two collection manners, namely, an explicit collection manner and an implicit connection manner, and thus the collection efficiency of the behavior data may be improved, the collected content of the behavior data may be enriched, and the collection quality of the behavior data may be ensured.

Furthermore, according to embodiments of the present disclosure, the user's positive feedback information regarding the resources in the header resource library in the behavior data may be obtained; and corresponding resource access features may be generated based on the user's positive feedback information regarding the resources in the header resource library in the behavior data, so that the resource access features include only features corresponding to the positive feedback information without considering negative feedback and other things. Therefore, the concern type of the model may be simplified, and the accuracy of the trained model may be improved such that the trained user click model may predict more accurately the resources that a user interests in.

With the above technical solution of the method for resource recommendation of these embodiments, very accurate predicted resource IDs may be obtained, and resources may be recommended to the user more purposefully, and thus the recommending efficiency may be improved and the user's viscosity and use experience may be enhanced.

It should be understood that the various forms of processes shown above may be used to reorder, add, or delete steps. For example, the steps described in the present disclosure may be performed in parallel, sequentially, or in different orders as long as the desired results of the technical solutions disclosed in the present disclosure may be achieved, which is not limited herein.

The foregoing specific implementations do not constitute a limitation on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for training a user click model implemented by a computer, comprising:
   collecting a plurality of pieces of behavior data from a log database of users on a network, each piece of behavior data comprising a user's feedback information regarding resources in the network within a preset time period;
   generating a plurality of resource access features respectively corresponding to the plurality of pieces of behavior data, based on a pre-created header resource library and the plurality of pieces of behavior data; and
   training the user click model with the plurality of resource access features,
   wherein the generating a plurality of resource access features respectively corresponding to the plurality of pieces of behavior data, based on a pre-created header resource library and the plurality of pieces of behavior data comprises:
   obtaining the user's positive feedback information regarding resources in the header resource library in the behavior data;
   generating corresponding resource access features, based on the user's positive feedback information regarding resources in the header resource library in the behavior data, to obtain the plurality of resource access features.

2. The method according to claim 1, further comprising: before the generating a plurality of resource access features respectively corresponding to the plurality of pieces of behavior data, based on a pre-created header resource library and the plurality of pieces of behavior data,
   filtering a global resource library according to attribute information of resources in the global resource library to obtain identifiers (IDs) of a plurality of header resources, wherein the global resource library records IDs of respective resources as well as respective attribute information of each resource;
   forming the header resource library with the IDs of the plurality of header resources.

3. The method according to claim 2, wherein the filtering a global resource library according to attribute information of resources in the global resource library to obtain IDs of a plurality of header resources comprises at least one of:
   filtering the global resource library according to quality parameters of the resources in the global resource library to obtain IDs of a plurality of resources whose quality parameters are larger than a preset quality parameter threshold, as the IDs of the header resources;
   filtering the global resource library according to access popularity of the resources in the global resource library to obtain IDs of a plurality of resources whose access popularity is larger than a preset popularity threshold, as the IDs of the header resources; and
   filtering the global resource library according to discriminations of the resources in the global resource library to obtain IDs of a plurality of resources whose discriminations are larger than a preset discrimination threshold, as the IDs of the header resources, wherein the discriminations of the resources are equal to a variance of the number of user groups having different feedbacks corresponding to the resources;
   or wherein the filtering a global resource library according to attribute information of resources in the global resource library to obtain IDs of a plurality of header resources includes at least one of:
   filtering the global resource library according to quality parameters of the resources in the global resource library to obtain IDs of Top N resources having the largest quality parameters, as the IDs of the header resources;
   filtering the global resource library according to access popularity of the resources in the global resource library to obtain IDs of Top M resources having the largest access popularity, as the IDs of the header resources; and
   filtering the global resource library according to discriminations of the resources in the global resource library to obtain IDs of Top W resources having the largest discriminations, as the IDs of the header resources; wherein N, M and W each is a positive integer.

4. The method according to claim 1, wherein the collecting a plurality of pieces of behavior data from a log database of users on a network comprises:
   collecting the plurality of pieces of behavior data from the log database in a manner of at least one of: an explicit collection manner through preset event tracking, and an implicit collection manner by analyzing the user's feedback information regarding resources.

5. The method according to claim 1, wherein the training the user click model with the plurality of resource access features comprises:
   for each resource access feature in the plurality of resource access features, shielding partial valid data in the resource access feature to obtain a resource access training feature;
   inputting the resource access training feature into the user click model to obtain a resource access prediction feature output by the user click model;

calculating a cross entropy function value based on the resource access feature and the resource access prediction feature;

determining whether the cross entropy function value is equal to 0;

if the value is not equal to 0, adjusting parameters of the user click model to make the cross entropy function value tend to 0;

continuously training the user click model using the plurality of resource access features in the above manner, until the cross entropy function value is equal to 0 in training of preset continuous times, determining the parameters of the user click model, then determining the user click model.

6. A method for resource recommendation implemented by a computer, comprising:

collecting real-time behavior data of a designated user within the most neighboring time period;

obtaining real-time resource access features of the designated user according to the real-time behavior data and a pre-created header resource library;

predicting k predicted resource identifiers (IDs) according to a user click model pre-trained with the method of claim 1, the real-time resource access features and the header resource library; and recommending resources to the designated user based on the k predicted resource IDs.

7. The method according to claim 6, wherein the predicting k predicted resource IDs according to a pre-trained user click model, the real-time resource access features and the header resource library comprises:

predicting predicted resource access features of the designated user according to the user click model and the real-time resource access features;

obtaining the k predicted resource IDs based on the predicted resource access features, the real-time resource access features and the header resource library.

8. An electronic device, comprising:

at least one processor; and a memory communicatively connected with the at least one processor; wherein, the memory stores instructions executable by the at least one processor, and the instructions are executed by the at least one processor to enable the at least one processor to perform a method for training a user click model, which comprises:

collecting a plurality of pieces of behavior data from a log database of users on a network, each piece of behavior data comprising a user's feedback information regarding resources in the network within a preset time period;

generating a plurality of resource access features respectively corresponding to the plurality of pieces of behavior data, based on a pre-created header resource library and the plurality of pieces of behavior data; and training the user click model with the plurality of resource access features, wherein the generating a plurality of resource access features respectively corresponding to the plurality of pieces of behavior data, based on a pre-created header resource library and the plurality of pieces of behavior data comprises:

obtaining the user's positive feedback information regarding resources in the header resource library in the behavior data;

generating corresponding resource access features, based on the user's positive feedback information regarding resources in the header resource library in the behavior data, to obtain the plurality of resource access features.

9. The electronic device according to claim 8, wherein the method further comprises: before the generating a plurality of resource access features respectively corresponding to the plurality of pieces of behavior data, based on a pre-created header resource library and the plurality of pieces of behavior data, filtering a global resource library according to attribute information of resources in the global resource library to obtain identifiers (IDs) of a plurality of header resources, wherein the global resource library records IDs of respective resources as well as respective attribute information of each resource;

forming the header resource library with the IDs of the plurality of header resources.

10. The electronic device according to claim 9, wherein the filtering a global resource library according to attribute information of resources in the global resource library to obtain IDs of a plurality of header resources comprises at least one of:

filtering the global resource library according to quality parameters of the resources in the global resource library to obtain IDs of a plurality of resources whose quality parameters are larger than a preset quality parameter threshold, as the IDs of the header resources;

filtering the global resource library according to access popularity of the resources in the global resource library to obtain IDs of a plurality of resources whose access popularity is larger than a preset popularity threshold, as the IDs of the header resources; and filtering the global resource library according to discriminations of the resources in the global resource library to obtain IDs of a plurality of resources whose discriminations are larger than a preset discrimination threshold, as the IDs of the header resources, wherein the discriminations of the resources are equal to a variance of the number of user groups having different feedbacks corresponding to the resources;

or wherein the filtering a global resource library according to attribute information of resources in the global resource library to obtain IDs of a plurality of header resources includes at least one of:

filtering the global resource library according to quality parameters of the resources in the global resource library to obtain IDs of Top N resources having the largest quality parameters, as the IDs of the header resources;

filtering the global resource library according to access popularity of the resources in the global resource library to obtain IDs of Top M resources having the largest access popularity, as the IDs of the header resources; and filtering the global resource library according to discriminations of the resources in the global resource library to obtain IDs of Top W resources having the largest discriminations, as the IDs of the header resources; wherein N, M and W each is a positive integer.

11. The electronic device according to claim 8, wherein the collecting a plurality of pieces of behavior data from a log database of users on a network comprises:

collecting the plurality of pieces of behavior data from the log database in a manner of at least one of: an explicit collection manner through preset event tracking, and an implicit collection manner by analyzing the user's feedback information regarding resources.

12. The electronic device according to claim 8, wherein the training the user click model with the plurality of resource access features comprises:
   for each resource access feature in the plurality of resource access features, shielding partial valid data in the resource access feature to obtain a resource access training feature;
   inputting the resource access training feature into the user click model to obtain a resource access prediction feature output by the user click model;
   calculating a cross entropy function value based on the resource access feature and the resource access prediction feature;
   determining whether the cross entropy function value is equal to 0;
   if the value is not equal to 0, adjusting parameters of the user click model to make the cross entropy function value tend to 0;
   continuously training the user click model using the plurality of resource access features in the above manner, until the cross entropy function value is equal to 0 in training of preset continuous times, determining the parameters of the user click model, then determining the user click model.

13. An electronic device, comprising:
   at least one processor; and
   a memory communicatively connected with the at least one processor; wherein,
   the memory stores instructions executable by the at least one processor, and the instructions are executed by the at least one processor to enable the at least one processor to perform a method for resource recommendation, which comprises:
   collecting real-time behavior data of a designated user within the most neighboring time period;
   obtaining real-time resource access features of the designated user according to the real-time behavior data and a pre-created header resource library;
   predicting k predicted resource identifiers (IDs) according to a user click model pre-trained with the method of claim 1, the real-time resource access features and the header resource library; and
   recommending resources to the designated user based on the k predicted resource IDs.

14. The electronic device according to claim 13, wherein the predicting k predicted resource IDs according to a pre-trained user click model, the real-time resource access features and the header resource library comprises:
   predicting predicted resource access features of the designated user according to the user click model and the real-time resource access features;
   obtaining the k predicted resource IDs based on the predicted resource access features, the real-time resource access features and the header resource library.

15. A non-transitory computer-readable storage medium storing computer instructions therein, wherein the computer instructions are used to cause the computer to perform a method for training a user click model, which comprises:
   collecting a plurality of pieces of behavior data from a log database of users on a network, each piece of behavior data comprising a user's feedback information regarding resources in the network within a preset time period;
   generating a plurality of resource access features respectively corresponding to the plurality of pieces of behavior data, based on a pre-created header resource library and the plurality of pieces of behavior data; and
   training the user click model with the plurality of resource access features,
   wherein the generating a plurality of resource access features respectively corresponding to the plurality of pieces of behavior data, based on a pre-created header resource library and the plurality of pieces of behavior data comprises:
   obtaining the user's positive feedback information regarding resources in the header resource library in the behavior data;
   generating corresponding resource access features, based on the user's positive feedback information regarding resources in the header resource library in the behavior data, to obtain the plurality of resource access features.

16. The non-transitory computer-readable storage medium according to claim 15, wherein the method further comprises: before the generating a plurality of resource access features respectively corresponding to the plurality of pieces of behavior data, based on a pre-created header resource library and the plurality of pieces of behavior data,
   filtering a global resource library according to attribute information of resources in the global resource library to obtain identifiers (IDs) of a plurality of header resources, wherein the global resource library records IDs of respective resources as well as respective attribute information of each resource;
   forming the header resource library with the IDs of the plurality of header resources.

17. The non-transitory computer-readable storage medium according to claim 16, wherein the filtering a global resource library according to attribute information of resources in the global resource library to obtain IDs of a plurality of header resources comprises at least one of:
   filtering the global resource library according to quality parameters of the resources in the global resource library to obtain IDs of a plurality of resources whose quality parameters are larger than a preset quality parameter threshold, as the IDs of the header resources;
   filtering the global resource library according to access popularity of the resources in the global resource library to obtain IDs of a plurality of resources whose access popularity is larger than a preset popularity threshold, as the IDs of the header resources; and
   filtering the global resource library according to discriminations of the resources in the global resource library to obtain IDs of a plurality of resources whose discriminations are larger than a preset discrimination threshold, as the IDs of the header resources, wherein the discriminations of the resources are equal to a variance of the number of user groups having different feedbacks corresponding to the resources;
   or wherein the filtering a global resource library according to attribute information of resources in the global resource library to obtain IDs of a plurality of header resources includes at least one of:
   filtering the global resource library according to quality parameters of the resources in the global resource library to obtain IDs of Top N resources having the largest quality parameters, as the IDs of the header resources;
   filtering the global resource library according to access popularity of the resources in the global resource library to obtain IDs of Top M resources having the largest access popularity, as the IDs of the header resources; and filtering the global resource library according to discriminations of the resources in the global resource library to obtain IDs of Top W resources having the largest discriminations, as the IDs of the header resources; wherein N, M and W each is a positive integer.

18. The non-transitory computer-readable storage medium according to claim 15, wherein the collecting a plurality of pieces of behavior data from a log database of users on a network comprises:

collecting the plurality of pieces of behavior data from the log database in a manner of at least one of: an explicit collection manner through preset event tracking, and an implicit collection manner by analyzing the user's feedback information regarding resources.

19. The non-transitory computer-readable storage medium according to claim 15, wherein the training the user click model with the plurality of resource access features comprises:

for each resource access feature in the plurality of resource access features, shielding partial valid data in the resource access feature to obtain a resource access training feature;

inputting the resource access training feature into the user click model to obtain a resource access prediction feature output by the user click model;

calculating a cross entropy function value based on the resource access feature and the resource access prediction feature;

determining whether the cross entropy function value is equal to 0;

if the value is not equal to 0, adjusting parameters of the user click model to make the cross entropy function value tend to 0;

continuously training the user click model using the plurality of resource access features in the above manner, until the cross entropy function value is equal to 0 in training of preset continuous times, determining the parameters of the user click model, then determining the user click model.

20. A non-transitory computer-readable storage medium storing computer instructions therein, wherein the computer instructions are used to cause the computer to perform a method for resource recommendation, which comprises:

collecting real-time behavior data of a designated user within the most neighboring time period;

obtaining real-time resource access features of the designated user according to the real-time behavior data and a pre-created header resource library;

predicting k predicted resource identifiers (IDs) according to a user click model pre-trained with the method of claim 1, the real-time resource access features and the header resource library; and recommending resources to the designated user based on the k predicted resource IDs.

21. The non-transitory computer-readable storage medium according to claim 20, wherein the predicting k predicted resource IDs according to a pre-trained user click model, the real-time resource access features and the header resource library comprises:

predicting predicted resource access features of the designated user according to the user click model and the real-time resource access features;

obtaining the k predicted resource IDs based on the predicted resource access features, the real-time resource access features and the header resource library.

* * * * *